United States Patent [19]

Baker et al.

[11] Patent Number: 4,824,522
[45] Date of Patent: Apr. 25, 1989

[54] FABRICATION OF POLYDIACETYLENE WAVEGUIDES

[75] Inventors: Gregory L. Baker, Bridgewater Township, Somerset County, N.J.; Cynthia F. Klausner, Amherst, Mass.

[73] Assignee: Bell Communications Research, Inc., Livingston, N.J.

[21] Appl. No.: 176,647

[22] Filed: Apr. 1, 1988

[51] Int. Cl.$^4$ .................. B44C 1/22; B29C 37/00; C03C 15/00; C03C 25/06
[52] U.S. Cl. ..................... 156/643; 156/646; 156/652; 156/657; 156/659.1; 156/668; 204/192.36; 350/96.12
[58] Field of Search ............ 350/96.1, 96.12; 156/643, 646, 652, 655, 657, 659.1, 662, 668; 204/192.36

[56] References Cited

U.S. PATENT DOCUMENTS 4,609,252 9/1986 Wong et al. .................. 350/96.12
4,610,502 9/1986 Nicia et al. .................. 350/96.12

*Primary Examiner*—William A. Powell
*Attorney, Agent, or Firm*—James W. Falk; Edward M. Fink

[57] ABSTRACT

Novel optical waveguides and methods for their fabrication are provided. The waveguides are made from polydiacetylene materials. The waveguides are made by a bilayer process wherein a film made from a soluble polydiacetylene material is applied to a substrate and a silicon-containing imaging layer is applied atop the polyacetylene layer. Thereafter a pattern is produced in the imaging layer, for example, by photolithographic methods, and the pattern is transferred to the underlying polydiacetylene layer by exposure to an oxygen plasma. Polydiacetylene waveguides greater than 0.4 microns thickness are thereby produced.

31 Claims, 1 Drawing Sheet

FABRICATION OF POLYDIACETYLENE WAVEGUIDES

FIELD OF THE INVENTION

This invention relates to novel methods of fabricating optical waveguides. More particularly, this invention relates to techniques for manufacturing optical waveguides made from polydiacetylenes. The present invention also encompasses a general technique for making fine patterns on a substrate by a bilayer process in which one of the layers is made from a polydiacetylene material.

BACKGROUND OF THE INVENTION

Optical waveguides are structures that constrain or guide the propagation of light along a path defined by the physical construction of the guide. The dimensions of the guide in the directions in which the light is confined are on the order of the wavelength of the light. Such optical waveguides comprise a region of high refractive index in which most of the optical field of the light is located surrounded by regions of lower refractive index. Typically, an optical waveguide comprises a three-layer or sandwich structure comprising a substrate, a middle layer, often called a film, and a top layer or cover. The top layer or cover is very frequently air. The index of refraction is largest in the middle layer or film.

The middle layer or film has been made in the past from many materials using a variety of different techniques. For example, the film has been made from sputtered glass, sputtered oxides of tantalum or zinc, epitaxial gallium arsenide, ion-bombarded gallium arsenide, epitaxial garnets, sputtered and epitaxial lithium niobate, nitrobenzene liquid, and a number of other organic and polymeric materials.

Recently, there has been increased interest in the use of organic materials for optical devices. In Auston et al., "Research on Nonlinear Optical Materials: An Assessment", 26 Applied Optics, pp. 211-234 (1987), which is incorporated herein by reference, a review is presented on recent research into optical materials, including organic and polymeric materials. Conjugated polymers in particular, such as the polyacetylenes and polydiacetylenes, are known to have high third-order optical non-linearities. Not only do these materials have extremely high third order hyperpolarizabilities, but they also have ultrafast (on the order of femtoseconds) response times. Thus, they are desirable materials for optical devices.

As described in Misin et al., "The Solid-Phase Polymerization of Monomers with Conjugated Acetylenic Groups", 56 Russian Chemical Reviews (1985), which is incorporated herein by reference, polydiacetylenes are prepared from diacetylene monomers by a solid state topotactic polymerization process. This process involves a direct transformation of crystalline diacetylene monomers having the general formula R—(C≡C)-$_r$—R' to crystalline polymer chains. The polydiacetylene crystals so synthesized are generally insoluble in common solvents, and only by elaborate crystallization techniques have polydiacetylenes suitable for optical devices been obtained.

Recently, several soluble polydiacetylenes have been synthesized and described in the literature. See, e.g., Muller et al., 185 Makromol. Chem. (1984), at p. 1727, and DE-OS No. 3347618 which are incorporated herein by reference. In the German patent document DE-OS No. 3346716, photolithographic methods are disclosed for making integrated electronic ciruits using polydiacetylenes as stable photoresists. According to the disclosure of this document, a soluble polydiacetylene is dissolved in a solvent, spin coated onto a silicon substrate, exposed to ultraviolet light through a mask, and developed in a given pattern to provide a precise resist image made from the polydiacetylene material.

Because of their excellent optical properties, it would be desirable to produce optical waveguides made from polydiacetylene materials. It would furthermore be desirable to produce optical waveguides made from polydiacetylene materials by a positive photolithographic process similar to the one described in the aforementioned DE-OS No. 3346716. However, the photolithographic process described in this patent document is not easily adapted to the manufacture of optical waveguides made from polydiacetylenes. This is because typical optical waveguides are about 0.8-2 microns, and because polydiacetylenes absorb ultraviolet light very strongly, the ultraviolet light which is used in the photolithographic process will not penetrate the polydiacetylene layer more than about 0.4 microns. It is therefore not possible to form a pattern in a polydiacetylene layer by such photolithographic techniques when the polydiacetylene layer is thicker than about 0.4 microns.

Accordingly, it is an object of the present invention to provide a novel method for producing a fine pattern in a polydiacetylene layer which is on a substrate.

It is another object of the present invention to provide a method for manufacturing optical waveguides of >0.4 microns in thickness from polydiacetylene materials.

It is yet another object of the present invention to provide a method for manufacturing optical waveguides from polydiacetylene materials which method utilizes a positive photolithographic process in one of its preferred embodiments.

SUMMARY OF THE INVENTION

The present invention provides a general method for producing fine patterns in a polydiacetylene layer which is on a substrate. The method of this invention is a "multilayer" process and involves several steps. In a first step of this method, a film made from a soluble polydiacetylene material is applied as a first layer to a substrate. In a second step, a silicon-containing polymer is applied as an oxygen reactive-ion-etching barrier. In a third step, a film is applied in which the pattern is developed by standard lithographic techniques. By using a silicon-containing photoresist, the functions of the second and third layers can be combined in a single layer and the modified process is termed a bilevel process. A pattern is then produced in the top or imaging layer by any known technique. For example, the pattern is desirably developed in the imaging layer in a positive photolithographic process. Thereafter, the pattern in the imaging layer is transferred through the underlying polydiacetylene layer by exposing the composite to an oxygen reactive ion etching environment, which will etch the polydiacetylene film in all places except where it is covered by the imaging layer to produce the desired pattern in the polydiacetylene film.

In a preferred embodiment, this method for producing fine patterns is adapted to produce optical waveguides of about 0.2–2 microns in thickness from polydiacetylene materials. In the preferred embodiment, a soluble polydiacetylene is spin coated in an appropriate thickness onto a substrate. Thereafter, a silicon-containing polyacetylene layer is applied atop the polydiacetylene as an imaging layer. A pattern is then developed in the imaging layer by irradiating selected portions of the imaging layer with ultraviolet light through a photomask in a positive photolithographic process. Finally, the pattern is transferred through the underlying film by exposing the composite to an oxygen reactive-ion-etching environment. This last step is capable of producing a pattern in the polydiacetylene film with features which are more than 0.4 microns in depth. Thus, optical waveguides of >0.4 microns in thickness and made from polydiacetylene materials can be produced by this multilayer process.

DETAILED DESCRIPTION

Figure 1:
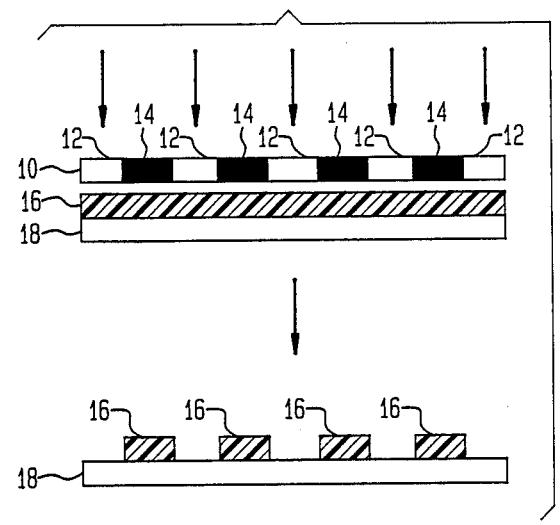
FIG. 1 illustrates a preferred embodiment of the bilayer process of the present invention.

Referring to FIG. 1, the bilayer process of the present invention for making optical waveguides from a polydiacetylene material is illustrated. In this embodiment, an imaging layer 20' is formed atop a polydiacetylene film layer 16'.

More specifically, in a first step of this bilayer process, a soluble polydiacetylene material such as the polydiacetylene known as poly(4BCMU) or poly(3BCMU), is dissolved in a suitable solvent, such as cyclopentanone, and spin coated onto a substrate 18'. The polydiacetylene film layer 16' is applied to substrate 18' at a thickness of about 0.8–2 microns, a thickness suitable for optical waveguides. The polydiacetylene film layer 16' has a higher index of refraction than that of substrate 18', which typically may comprise quartz, glass, or an organic polymer. The substrate 18' and the film layer 16' are then baked to remove the solvent. Next, imaging layer 20' is spin coated on film 16' and baked to remove the solvent from the imaging layer. Imaging layer 20' is preferably made from a silicon-containing material and generally is not as deep as the polydiacetylene film layer 16'. Imaging layer 20' may be made, for example, from a material containing silicon, tin, or germanium. A thin pattern of lines is then developed in imaging layer 20'. This pattern may be formed in imaging layer 20' by any known method, for example, by electron beam or X-ray lithography techniques, although it is most desirably formed by positive photolithographic techniques.

In the next step of the process, the pattern in imaging layer 20' is transferred through the polydiacetylene layer 16' below the imaging layer 20' by exposing the imaging layer 16' to a reactive ion etching environment, such as an oxygen plasma. The technique known as reactive ion etching (RIE) is capable of transferring a pattern achieved by photolithography or other methods in one layer to an underlying material. In accordance with this method, a plasma, such as an oxygen plasma, will etch a surface unless it has been covered with a material which is impervious to the plasma, for example, a material which forms a refractory oxide in an oxygen plasma.

Thus, an oxygen plasma will etch through the polydiacetylene layer 16' except in those locations where it is covered by the patterned strips of imaging layer 20', which is made from a material containing silicon, tin, or germanium. The pattern formed in the imaging layer 20' is thereby transferred through to the underlying polydiacetylene film layer 16' to much greater depths than those achievable in polydiacetylenes by photolithography. As a result, optical waveguides comprising a substrate 18', a polydiacetylene layer 16' of about 0.8–2 microns thickness, and an imaging layer 20' are formed. If the imaging layer 20' interferes with the desired optical properties of the waveguides, it may be removed by dissolving it in a suitable solvent. Because there is a tendency for silicon to migrate from the imaging layer 20' into the film layer 16', it may be desirable to provide a thin barrier layer between imaging layer 20' and film layer 16' which prevents intermixing of the polydiacetylene and imaging layers. The buffer layer may, for example, comprise a layer of carbon (sputtered or plasma deposited or polyvinyl alcohol.

Figure 2:
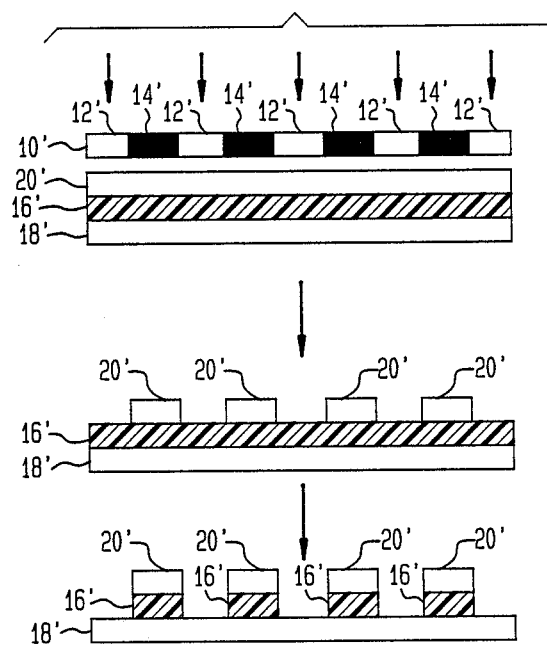
FIG. 2 illustrates an optical waveguide produced by the bilayer process of the present invention.

In a preferred embodiment, the imaging layer 20' comprises a silicon-containing polyacetylene which is suitable for being patterned by positive photolithographic methods. For example, imaging layer 20' may be made from a trimethylsily-substituted polyacetylene, such as brominated poly(1-trimethylsilylpropyne) described by Gozdz et al. in SPIE Vol. 771, Advances in Resist Technology and Processing IV (1987), pp. 18–23, which is incorporated herein by reference. In this preferred embodiment, the desired pattern is produced on the imaging layer 20' through a positive photolithographic technique such as the one described above. This pattern in imaging layer 20' is shown in FIG. 2.

In general, the film layer 16' may be made from any polydiacetylene material which can be dissolved in a suitable solvent and spin coated onto a substrate. Suitable polydiacetylenes have the general structural formula

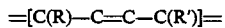
$$=[C(R)-C\equiv C-C(R')]=$$

wherein R and R' are $C_1$–$C_{50}$ aliphatic groups, aromatic groups, or a combination of aliphatic and aromatic groups, with or with heteroatoms, and wherein R and R' may be the same or different.

Specific examples of soluble polydiacetylenes which may be used in accordance with the techniques of the present invention are those listed in Table 1 below, taken from the above-referenced Muller et al., 185 Makromol Chem.

TABLE 1

| Systematic Name | Abbreviation common in literature | Side chain Characteristics | Solvent |
|---|---|---|---|
| 1. Poly[1,2-bis-(anilinocarbonyloxymethyl)-1-buten-3-ynylene] | HDPU | ester | HMPA (hexamethylphosphoric triamide) |
| 2. Poly[1,2-bis- | PTS | sulfonyl | γ-nitrobenzene |

TABLE 1-continued

| Systematic Name | Abbreviation common in literature | Side chain Characteristics | Solvent |
| --- | --- | --- | --- |
| (p-tolylsulfonyloxymethyl)-1-buten-3-ynylene] | | ester | butyrolactone |
| 3 Poly[1,2-didodecyl-1-buten-3-ynylene] | C-28 | long hydrocarbon | decalin, nonpolar hydrocarbons |
| 4. Poly[1,2-bis[3-(N—valeryloxymethyl)-carbamoyloxy)propyl]-1-buten-3-ynylene] | P-3BCMU | hydrocarbon side chain, urethane | $CHCl_3$, DMF |
| 5 Poly[1,2-bis[4-(N—valeryloxymethyl)-carbamoyloxy)butyl]-1-buten-3-ynylene] | P-4BCMU | hydrocarbon side chain, urethane | $CHCl_3$, chlorobenzene |
| 6. Poly[1,2-bis[4-(p-tolylsulfonyloxy)-butyl]-1-buten-3-ynylene] | PTS-12 | hydrocarbon side chain, ester | $CHCl_3$ |
| 7. Poly[1,2-bis-[9-(phenylacetoxy)nonyl]-1-buten-3-ynylene] | P-PHE-22 | hydrocarbon side chain, ester | $CHCl_3$ |
| 8. Poly[1,2-bis[9-(isonicotinoyloxy)nonyl]-1-buten-3-ynylene] | P-NIC-22 | hydrocarbon side chain, ester | $CHCl_3$ |
| 9. Poly[1,2-bis[4-(isonicotinoyloxy)butyl]-1-buten-3-ynylen] | P-NIC-12 | hydrocarbon side chain, ester | $CHCl_3$ |

Preferably, the polydiacetylene layer 16' is made from poly(4BCMU), poly(3BCMU), or poly(TS12). The structure of these materials can be discerned from the systematic names given in Table 1 for these entries.

In carrying out the above-described process for producing optical waveguides, the polydiacetylene film 16' should be spin coated onto the substrate at a thickness of about 0.8 to 2 microns. The temperature at which the film should be baked in order to drive off the solvent should be less than the decomposition temperature of the polydiacetylene, i.e., less than about 150° C. and preferably about 70°–100° C.

It should be understood that the principles of the bilayer process described above are not restricted to the manufacture of optical waveguides. The present bilayer process may be adapted to fabricate any kind of fine pattern in a polydiacetylene layer on a substrate. For example, integrated optical circuits can be made using polydiacetylenes as a photoresist layer in a bilayer process as described above.

The present invention will now be described by reference to the following specific examples.

EXAMPLE 1

This example describes the manufacture of three-dimensional features in polydiacetylene films using a bilayer process.

A film of poly(4BCMU) of 1.0 microns in thickness was deposited from cyclopentanone onto polished silicon substrates that had been previously coated with 1.5 microns of a hard-baked planarizing material. Thereafter, the film was baked at 70° C. for 10 minutes. Next, the wafer was spin coated with a solution of bominated poly(trimethylsilyl-1-propyne) (10% brominated) in dimethylcyclohexane, giving a 0.3 micron imaging layer. The composite film was then baked for 10 minutes at 120° C. The film was then exposed in air through a chromium on quartz mask using a deep-ultraviolet radiation source equipped with a 500 watt high pressure Xe-Hg lamp. The exposure tool was equipped with a dichroic mirror and optical system capable of delivering approximately 24 mW/cm$^2$ at 240–2280 nm at the wafer plane. The exposed wafer was baked at 140° C. for one hour in air, and was developed for 30 seconds at room temperature in 2-butanol. This completed the positive photolithographic process for producing a pattern in the imaging layer. The pattern was then transferred by reactive ion etching in a Cooke Vacuum model C-71-3 parallel plate RIE system operating at 13.56 MHz at a power density of 0.14 W/cm$^2$, a self bias of $-350$ volts, an oxygen pressure of 20 mtorr, and an oxygen flow rate of 10 sccm. Those films wherein the polydiacetylene layer is 0.8–2 microns thick function satisfactorily as optical waveguides.

EXAMPLE 2

The procedures followed were the same as those of Example 1 except that the polydiacetylene was poly(3BCMU) which was spin coated from N,N-dimethylformamide solution. Satisfactory optical waveguides are produced when the polydiacetylene layer is 0.8–2 microns thick.

EXAMPLE 3

A 1.5 film of poly(4BCMU) was spin-coated from a cyclopentanone solution onto a quartz disc. Thereafter, the film was baked at 70° C. for 10 minutes. Next, the film was spin-coated with an aqueous solution of polyvinyl alcohol, giving a 0.2 barrier layer. Finally, a 0.3 imaging layer of brominated poly(trimethylsilyl-1-propyne) was spin-coated onto the disc to give a multilayer coating. The composite structure was then baked for 10 minutes at 120° C. The film was then exposed and processed as in example 1, giving a patterned waveguide structure in the poly(4BCMU) layer.

While the invention has been described by reference to specific embodiments, this was for purposes of illustration only and should not be construed to limit the spirit or the scope of the invention.

What is claimed is:

1. A process for the manufacture of optical waveguides comprising
    applying a first layer of an optical material made from a soluble polydiacetylene to a substrate,
    applying a second layer atop said first layer, producing a pattern in said second layer, and
transferring said pattern to said first layer by exposing said second layer to a reactive ion etching environment,
said second layer being made from a material which is resistant to said reactive ion etching environment.

2. The method of claim 1 wherein said optical material is a soluble polydiacetylene having the general formula $$=[C(R)-C\equiv C-C(R')]=$$

wherein R and R' are $C_1$–$C_{50}$ aliphatic groups, aromatic groups, or a combination of aliphatic and aromatic groups, with or without heteroatoms, and wherein R and R' may be the same or different.

3. The method of claim 1 wherein said optical material is poly(4BCMU), poly(3BCMU), or poly(TS12).

4. The method of claim 1 wherein said optical material is poly(4BCMU).

5. The method of claim 1 wherein said reactive ion etching environment comprises an oxygen plasma.

6. The method of claim 1 wherein said second layer is made from a silicon-containing material.

7. The method of claim 1 wherein said second layer is made from a silicon-containing polyacetylene.

8. The method of claim 1 wherein said second layer is made from a trimethylsilyl-substituted polyacetylene.

9. The method of claim 1 wherein said pattern is developed in said second layer by a positive photolithographic process.

10. The method of claim 1 wherein said first layer has a thickness of about 0.8–2 microns.

11. The method of claim 1 wherein said pattern on said first layer comprises strips having a width and a depth of about 0.8 to 2 microns.

12. The method of claim 1 further comprising applying a barrier layer between said first and second layers, said barrier layer preventing intermixing of said first and second layers.

13. The method of claim 12 wherein said barrier layer is a carbon-containing substrate.

14. The method of claim 12 wherein said barrier is poly(vinylalcohol).

15. A method for applying a film pattern of small geometry to a substrate, comprising
applying a first layer comprising an optical material to a substrate, said optical material being made from a soluble polydiacetylene,
applying a second layer atop said first layer,
producing a pattern of small geometry in said second layer, and
transferring said pattern to said first layer by exposing said second layer to a reactive ion etching environment,
said second layer being made from a material which is resistant to said reactive ion etching environment.

16. The method of claim 15 wherein said optical material is a soluble polydiacetylene having the general formula $$=[C(R)-C\equiv C-C(R')]=$$

wherein R and R' are $C_1$–$C_{50}$ aliphatic groups, aromatic groups, or a combination of aliphatic and aromatic groups, with or without heteroatoms, and wherein R and R' may be the same or different.

17. The method of claim 15 wherein said optical material is poly(4BCMU), poly(3BCMU) or poly(TS12).

18. The method of claim 15 wherein said optical material is poly(4BCMU).

19. The method of claim 15 wherein said reactive ion etching environment comprises an oxygen plasma.

20. The method of claim 15 wherein said second layer is made from a silicon-containing material.

21. The method of claim 14 wherein said second layer is made from a silicon-containing polyacetylene.

22. The method of claim 15 wherein said second layer is made from a trimethyl silyl-substituted polyacetylene.

23. The method of claim 15 wherein said pattern is produced by irradiating said second layer with ultraviolet light through a photomask.

24. The method of claim 15 wherein said pattern is produced in said second layer by a positive photolithographic process.

25. An optical waveguide, comprising a substrate, a film layer on said substrate, and a top layer on said film layer, said film layer having an index of refraction greater than that of said substrate and said top layer, said film layer having a thickness of about 0.8 to 2 microns, said film layer being made from a soluble polydiacetylene.

26. The optical waveguide of claim 25, wherein said film is made from a soluble polydiacetylene having the general formula $$=[C(R)-C\equiv C-C(R')]=$$

wherein R and R' are $C_1$–$C_{50}$ aliphatic groups, aromatic groups, or a combination of aliphatic and aromatic groups, with or without heteroatoms, and wherein R and R' may be the same or different.

27. The optical waveguide of claim 25, wherein said film is made from poly(4BCMU), poly(3BCMU), or poly(TS12).

28. The optical waveguide of claim 25, wherein said film is made from poly(4BCMU).

29. The optical waveguide of claim 25, wherein said film comprises strips.

30. The optical waveguide of claim 25, wherein said film comprises strips having a width and a depth of about 0.8 to 2 microns.

31. The optical waveguide of claim 25, wherein said film comprises strips having a width and a depth of about 1.5 microns.

* * * * *

UNITED STATES PATENT AND TRADEMARK OFFICE
CERTIFICATE OF CORRECTION

PATENT NO. : 4,824,522

DATED : April 25, 1989

INVENTOR(S) : Gregory L. Baker and Cynthia F. Klausner

It is certified that error appears in the above-identified patent and that said Letters Patent is hereby corrected as shown below:

Column 4, line 29, after "deposited" insert --)--;
          line 53, before "heteroatoms" delete "with" and insert --without--.
Column 5, line 25, "ynylen" should read --ynylene--.

Signed and Sealed this

Thirty-first Day of December, 1991

Attest:

HARRY F. MANBECK, JR.

*Attesting Officer*    *Commissioner of Patents and Trademarks*